United States Patent [19]

Boothroyd

[11] 3,933,096

[45] Jan. 20, 1976

[54] GYROSCOPIC RATE SWITCH

[75] Inventor: Howard W. Boothroyd, Amherst, N.H.

[73] Assignee: The United States of America as represented by the Secretary of the Army, Washington, D.C.

[22] Filed: Mar. 11, 1974

[21] Appl. No.: 449,884

[52] U.S. Cl. ............... 102/70.2 R; 74/5.12; 74/5.43
[51] Int. Cl.² ................. F42C 15/40; G01C 19/14
[58] Field of Search ........... 102/70.2 R, 70.2 G, 81, 102/81.2, DIG. 3; 74/5.1, 5.12, 5.14, 5.43

[56] References Cited
UNITED STATES PATENTS

| | | | |
|---|---|---|---|
| 3,020,769 | 2/1962 | Bentley et al. | 74/5.1 |
| 3,082,630 | 3/1963 | Peterson et al. | 74/5.12 |
| 3,827,361 | 8/1974 | Zechnowitz et al. | 102/70.2 R |

Primary Examiner—Verlin R. Pendegrass
Assistant Examiner—C. T. Jordan
Attorney, Agent, or Firm—Nathan Edelberg; Robert P. Gibson; Max Yarmovsky

[57] ABSTRACT

A gyroscopic rate switch is held in an open position by a torsionally restrained gimbal in a pressurized compartmentalized housing. Run-up of the rotor, uncaging of the gimbal, and actuation of electrical switches is accomplished by controlled release of pressurized gas from the housing through operatively positioned orifices in the gimbal to an exhaust port. A temperature compensated by-pass valve in the housing makes the rate switch operation insensitive to and independent of environmental changes in temperatures by providing an alternate gas escape route for the gas available for rotor spin-up.

The rate switch is functionally operated by the precession of the uncaged gimbal upon spin-up of the rotor and spin of the missile.

6 Claims, 2 Drawing Figures

3,933,096

GYROSCOPIC RATE SWITCH

GOVERNMENTAL INTEREST

The invention described herein may be manufactured, used and licensed by or for the Government for governmental purposes without the payment to me of any royalty thereon.

BACKGROUND OF THE INVENTION

Various means have been used in the prior art to function a gyroscopic rate switch. In the past the rotor of the gyroscopic switch was run-up and maintained at constant speed by the use of an electric motor. The prior art devices using electrically driven rotors have been unsatisfactory because of the difficulty in bringing the rotor speed up to a constant value in less than 0.4 seconds and for maintaining it constant for a period of more than 10 seconds without the use of relatively large size heavy auxiliary batteries. Guided missiles, using the aforementioned prior art rate switches for determining spin rate, have had to sacrifice valuable warhead size and reduced lethality because of the necessity of carrying an external power source for the operation of the gyroscope.

SUMMARY OF THE INVENTION

The present invention relates to an improved pneumatically operated gyroscopic rate switch whose input axis is axially aligned with the longitudinal axis of a missile. A gimbaled rotor is operatively positioned in one of two compartments of a pressurized housing.

The torsionally restrained gimbal is uncaged when a frangible exhaust cap is ruptured by an explosive squib. The suddenly opened exhaust port permits gas to flow from a first pressurized compartment of the housing to a gimbal housing through a pair of rotor spin-up orifices. The sudden reduction of gas pressure in a first pressurized volume causes a spring-biased piston to be activated by the higher pressure of a second pressurized compartment. In addition residual high pressure gas from the second compartment, which is fed to the first lower gas pressure compartment through a calibrated orifice, permits the rotor to maintain near constant speed for 10 seconds. Movement of the piston uncages the gimbal housing and activates electrical interlock safing and arming switches connected thereto. The ratio of gas input to the rotor in relation to the spin rate of the missile causes the gimbal housing to precess and in turn activate a rate switch which is operatively attached to the rate switch housing and the gimbal housing. When both compartments of the rate switch housing have attained equal pressures therein, the biased piston will recage the gimbal and return the rate switch to its original position.

One of the objects of this invention is to provide a pneumatic gyroscopic rate switch which will function when the missile to which it is affixed reaches a specific spin velocity.

Another object of the present invention is to provide a gyroscopic rate switch which does away with the requirement for electrical power to operate a rotor.

Another object of the present invention is to provide a gyroscopic rate switch which has a self-contained pneumatic power source.

Another object of the present invention is to provide a pneumatic gyroscopic rate switch which is independent of environmental temperature variations.

Another object of the present invention is to provide a pneumatic gyroscopic rate switch which is capable of maintaining constant rotor speed for 10 seconds minimum regardless of environmental temperature changes.

Another object of the present invention is to provide a pneumatic gyroscopic rate switch whose rotor is automatically uncaged and recaged.

A further object of the present invention is to provide a pneumatic gyroscopic rate switch whose rotor run-up time is less than 0.4 seconds.

For a better understanding of the present invention together with other and further objects thereof reference is made to the following description taken in connection with the accompanying drawings.

BRIEF DESCRIPTION OF THE DRAWINGS

Throughout the following description like reference numerals are used to denote like parts in the drawings.

DESCRIPTION OF THE PREFERRED EMBODIMENTS

Figure 1:
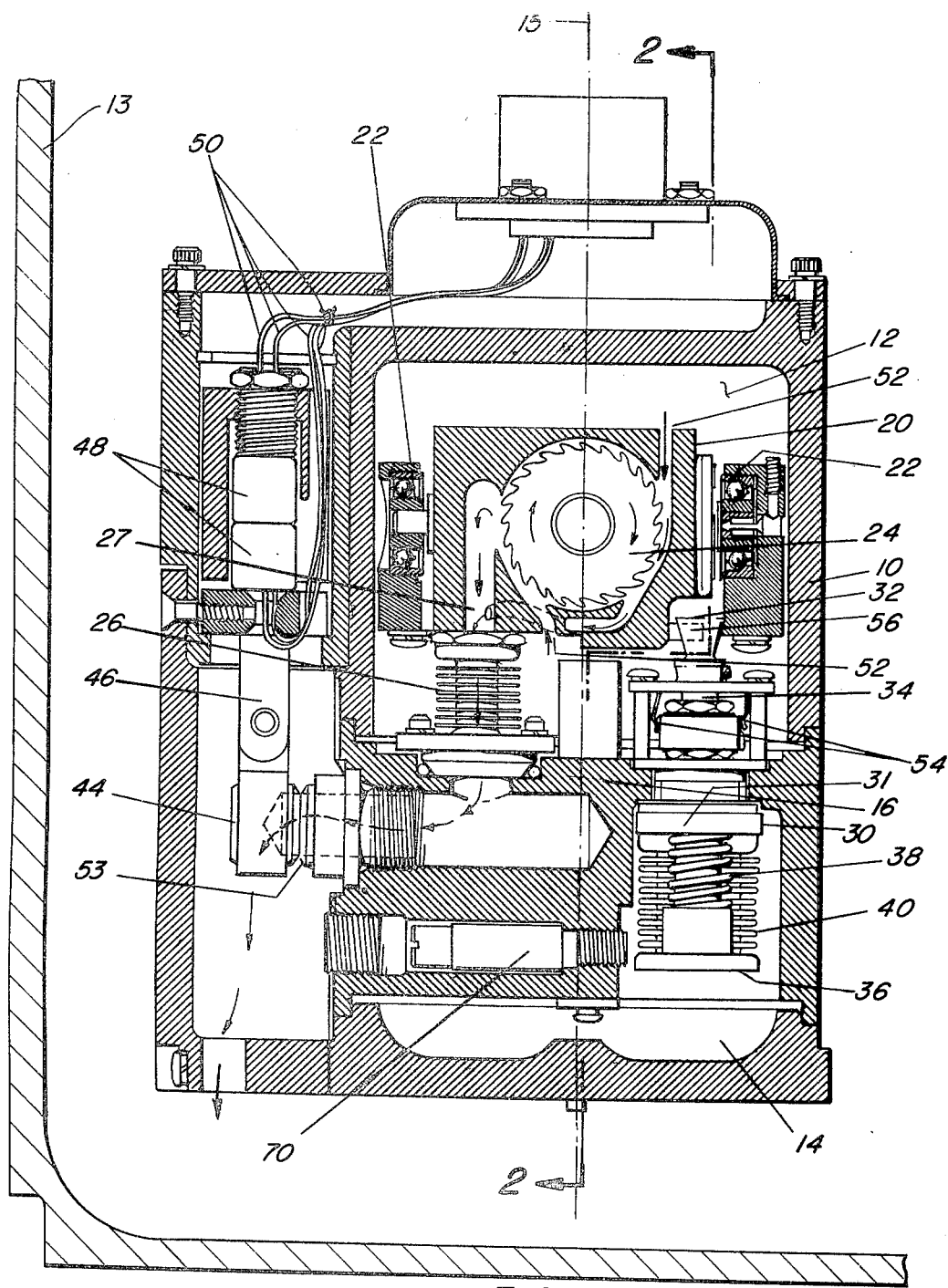
FIG. 1 is a partial cross-sectional view of a gyroscopic rate switch embodying the invention, showing the gimbal rotor, exhaust release means, and the caging means.
Figure 2:
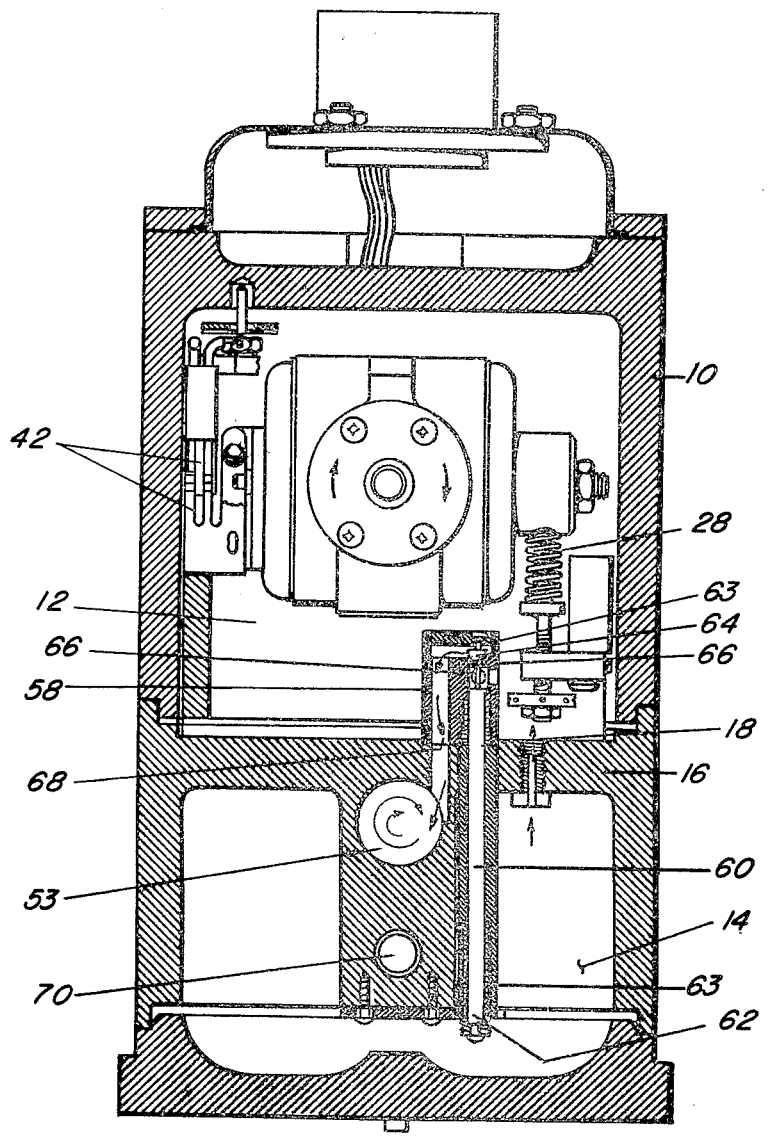
FIG. 2, is a partial cross-sectional view of the switch taken along line 2—2 as illustrated in FIG. 1.

Referring now to FIGS. 1 and 2, a rate switch housing 10 is divided into two separate internal chambers, a first chamber or boost chamber 12 and a second chamber or sustaining chamber 14. The device is oriented in a missile 13 to which it is attached so that the input axis 15 is axially aligned with the longitudinal axis of the missile. The two aforementioned chambers are pneumatically interconnected through common housing wall 16 by a calibrated orifice 18. A gimbal housing 20 is rotatably supported in bearings 22 and has completely enclosed within the gimbal housing 20 a rotor 24. The gimbal housing 20 is torsionally restrained from the housing 10 by an exhaust bellows 26 and an adjustable spring assembly 28. The gimbal housing 20 is held in a caged position by a spring biased-piston-bellows caging assembly 30. A conically shaped gimbal stop 32 is mounted on cage piston shaft 34 which is slidably held in piston housing 31, and is integral with cage piston 36 which is in turn held and forced downward by a biased cage spring 38 and cage bellows 40. The function or rate switch 42 is activated by gimbal housing 20 precession. A frangible exhaust cap 44 is ruptured by piston actuator 46 which is moved in a downwardly direction by electrically fired explosive squib motors 48 when a firing signal is received through electrical conductors 50. When exhaust cap 44 is ruptured gas from the first chamber 12 passes through gimbal housing input ports 52 causing the rotor 24 to reach its maximum speed in approximately 0.4 seconds. The gas from the gimbal housing 20 vents to the exhaust bellows 26 and through gimbal housing exhaust port 27 and thence through the housing 10 via housing exhaust port 53. Simultaneously with the rupturing of the exhaust cap 44, cage piston 36 is forced upward by the higher pressure in the second chamber 14, thereby causing electrical switch closure to a pair of uncaging interlock output switches 54 and physically uncaging the gimbal housing 20 by moving the inverted conically shaped gimbal stop 32 away from gimbal rod 56. The upward movement of the inverted conically shaped gimbal stop 32 has the effect of presenting to gimbal rod 56 a conical camming surface having a smaller diameter than was previously in contact therewith, thus providing a free precessing space therebetween. The gimbal housing 20 may now precess, in response to the forces exerted thereon by the missile angular velocity and the rotor speed, thereby causing activation of the function switch 42. For 10 seconds after actuation of the rotor 24 gas from the second chamber passes through the calibrated orifice 18, through the gimbal orifices 52 thereby maintaining the speed of rotor 24 relatively constant. Near constant rotor speed is essential, since variation in rotor speed produces a corresponding error in the recognized switching rate. At the end of the rate switch's useful life, which is 10 seconds after actuation, the cage piston 36 returns by the force of cage spring 38 to its original position due to dissipation of the second chamber gas pressure, and then by cam action recages the gimbal housing 20. Since temperature variations cause corresponding pressure variations in a closed chamber, and pressure variations in this device will cause rotor speed variations at run-up, a temperature compensating valve assembly 58 is provided to regulate the rotor run-up gas pressure. A NYLON expansion rod 60 has a threaded first end 62 threadedly attached to the by-pass valve housing 63, and a movable free valve end 64 which by expansion opens and restricts the passage of gas from the valve input orifice 66 so that more or less gas, as a function of temperature, can be by-passed to the exhaust port 53 through the by-pass exhaust port 68. Since the valve assembly 58 has an effective orifice area which is a function temperature, the gyroswitch when fired at high ambient temperature expels more of the stored gas to the exhaust port 53 than is the case of when the missile is subjected to a low ambient temperature. Thus the valve assembly 58 regulates rotor speed by allowing some of the gas to by-pass the rotor and to be expelled directly into the exhaust port 53.

Prior to missile launch the first and second chambers 12 and 14 are charged with a high pressure gas such as dry nitrogen through the high pressure valve assembly 70 which communicates directly with the second chamber 14 and with the first chamber 12 through orifice 18.

Safing against accidental closure of the rate function switch 42 is provided by having its terminals electrically connected in series with the uncaging interlock switches 54 so that the circuit connected to the function switch 42 can only be completed when the gimbal housing 20 is uncaged and has precessed.

In the event that gas from the first and/or second chambers 12 and 14 respectively should slowly leak out of housing 10 by some accident, the uncaging piston 36 will not function since the first and second chamber pressures will equalize through the calibrated orifice 18. In the event the device should accidently be exposed to an excessively high temperature, as by fire, soft solder hermetic seals will melt and release the gas slowly.

While there has been described and illustrated specific embodiments of the invention, it will be obvious that various changes, modifications and additions can be made therein without departing from the field of the invention which should be limited only by the scope of the appended claims.

Having thus fully described the invention, what is claimed as new and desired to be secured by letters Patent of the United States is:

1. A pneumatic gyroscopic rate switch for arming and safing a spinning missile which comprises:
   hermetically sealed housing means having an input axis axially aligned with the longitudinal axis of said missile, a transversely positioned common housing wall having a calibrated orifice therein dividing said housing means into a first and a second chamber, said first and second chambers containing a pressurized gas therein and communicating with each other through said calibrated orifice;
   pneumatic valve means fixedly attached to said housing means for pressurizing said housing means;
   pneumatic gyroscopic means rotatably supported by said housing means within said first chamber;
   frangible exhaust means, operatively connected to said housing means, pneumatically communicating with and torsionally restraining said gyroscopic means;
   pneumatic caging means operatively positioned in said housing means for caging and uncaging said gyroscopic means, having a pair of electrical interlock switches affixed to said caging means, said interlock switches being closed by said caging means in response to a pressure differential in said first and second chambers;
   temperature compensating pneumatic by-pass valve means operatively positioned in said housing and communicating with said first chamber and said exhaust means, said valve means controlling the gas flow rate from said first chamber to said exhaust means as a function of temperature; and
   an electrical switch operatively attached to said housing means and said gyroscopic means, said switch closing in response to the precessing motion of said gyroscopic means thereby arming said missile.

2. A gyroscopic rate switch as recited in claim 1 wherein the gyroscopic means comprises:
   a hollow gimbal housing having its axis of rotation lying in a plane perpendicular to said input axis, said gimbal housing having a plurality of input ports communicating with said first chamber and an exhaust port communicating with said exhaust means; and
   a rotor operatively supported by said gimbal housing having its axis of rotation perpendicular to said gimbal axis of rotation and perpendicular to said input axis, said rotor being driven by the flow of said gas from said first and second chambers through said gimbal housing input ports and exhaust ports.

3. A gyroscopic rate switch as recited in claim 1 wherein the caging means comprises:
   a piston housing operatively positioned in said common housing wall;
   a piston slidably held in said piston housing and disposed adjacent said gimbal housing;
   an inverted conically shaped gimbal stop fixedly attached to the shaft end of said piston, said stop being in contact with said gimbal housing when said gimbal housing is caged;
   a coil spring biasedly holding said piston so that said gimbal housing is caged when said frangible exhaust means has not been initiated and when the gas pressure in said first and second chambers are equal;

a bellows having one end hermetically sealed to the other end of said piston and the other end of said bellows hermetically sealed to said piston housing so that said gas in said second chamber cannot leak through said piston housing to said first chamber; and a pair of uncaging interlock output switches operatively mounted on said piston and said piston housing, for safing said missile so that said rate switch remains open when said gimbal housing is caged, said rate switch arming said missile when said gimbal housing is uncaged and has precessed.

4. A gyroscopic rate switch as recited in claim 1 wherein the frangible exhaust means comprises:

an electrical explosive squib motor;

a piston actuator operatively connected to the output of said squib motor; and a frangible exhaust cap connected to said housing exhaust port and to said piston actuator, whereby said exhaust port is opened when said explosive squib motor is initiated causing said piston actuator to move downwardly and rupture said cap.

5. A gyroscopic rate switch as recited in claim 1 wherein said pressurized gas is dry nitrogen.

6. A gyroscopic rate switch as recited in claim 1 wherein the temperature compensating by-pass valve means comprises:

a valve housing having a valve input orifice and a valve exhaust port therein which communicate with each other, wherein said valve input orifice communicates with said first chamber and said valve exhaust port communicates with said housing exhaust port;

a rod having a fixed end attached to said valve housing and a free movable end operatively positioned intermediate said valve input orifice and said valve exhaust port for regulating the passage of gas through said by-pass valve means as a function of temperature through expansion and contraction of said rod free end so that it opens and closes said valve means.

* * * * *